United States Patent [19]
Nakanishi

[11] 3,873,605
[45] Mar. 25, 1975

[54] RESOLUTION OF AN IMPORTANT PROSTAGLANDIN INTERMEDIATE

[75] Inventor: Susumu Nakanishi, East Lyme, Conn.

[73] Assignee: Pfizer Inc., New York, N.Y.

[22] Filed: Jan. 29, 1974

[21] Appl. No.: 437,699

Related U.S. Application Data

[63] Continuation-in-part of Ser. No. 188,766, Oct. 13, 1971, abandoned.

[52] U.S. Cl............ 260/501.1, 260/520, 260/514 D
[51] Int. Cl............................................. C07c 87/28
[58] Field of Search............ 260/501.1, 514 K, 520, 260/514 D

[56] References Cited
UNITED STATES PATENTS
3,766,264  10/1973  Schaaf et al. ...................... 260/520

OTHER PUBLICATIONS
Corey et al., J. Am. Chem. Soc., Vol. 93, No. 6, pp. 1491–1493 (March 24, 1971).
Eliel: Stereochemistry of Carbon Compounds, McGraw–Hill Co., N.Y. (1962), pp. 49–50.

*Primary Examiner*—Leon Zitver
*Assistant Examiner*—Michael W. Glynn
*Attorney, Agent, or Firm*—Connolly and Hutz

[57] ABSTRACT

A process for resolving 2-(2β-benzyloxymethyl-3α-hydroxy-4-cyclopentene-1α-yl) acetic acid which comprises fractionally crystallizing the d(+)-amphetamine salt of said acid from a solvent selected from ethylene dichloride, dioxane, ethylene dichloride-methylene chloride, or tetramethylenedichloride-chloroform for a period of up to about 18 hours and then separating the resulting crystalline salt therefrom.

7 Claims, No Drawings

RESOLUTION OF AN IMPORTANT PROSTAGLANDIN INTERMEDIATE

CROSS REFERENCE TO RELATED APPLICATIONS

This application is a continuation-in-part of my copending application Ser. No. 188,766, filed Oct. 13, 1971, now abandoned.

BACKGROUND OF THE INVENTION

This invention relates to the resolution of 2-(2β-benzyloxymethyl-3α-hydroxy-4-cyclopentene-1α-yl)acetic acid into its optically active components. Said resolved compounds serve as key intermediates in the Corey syntheses of prostaglandins.

The syntheses of prostaglandin $E_1$ in its optically active form constituted a notable achievement by E. J. Corey and his associates (*J. Amer. Chem. Soc.* 91, 535 (1969). Their synthetic sequences are particularly characterized by mild and specific reaction conditions. Further progress in prostaglandin research was severely encumbered by the lack of a facile, versatile, and commercially feasible synthesis for the optically active forms of $PGE_2$ and other natural prostaglandins such as $PGE_1$, $PGF_{2\alpha}$, $PGF_{1\alpha}$, $PGA_2$, and $PGA_1$.

The facile resolution of the critical hydroxy acid 2-(2β-benzyloxymethyl-3α-hydroxy-4-cyclopentene-1α-yl)acetic acid, has been a major obstacle in the multistep process for prostaglandin production developed by Corey. The resolved (+)-hydroxy acid leads to the prostaglandins presently known to be of physiological importance while the (−)-hydroxy acid can be used to synthesize prostaglandins which at this time have no known physiological role. It is the present invention, in fact, which will make possible the commercially successful production of prostaglandins.

As is well known, members of the family of naturally occurring prostaglandins, and analogues thereof, have exhibited valuable therapeutic properties in control of fertility, hypertension, pulmonary disorders, peptic ulcers, and thrombosis.

SUMMARY OF THE INVENTION

The present invention comprises a process of resolving racemic 2-(2β-benzyloxymethyl-3α-hydroxy-4-cyclopentene-1α-yl)acetic acid by fractionally crystallizing the d(+)-amphetamine salt of said acid from a solvent selected from ethylene dichloride, dioxane, ethylene dichloride-methylene chloride, or tetramethylenedichloridechloroform for a period of up to about 18 hours and then separating the resulting crystalline salt therefrom. The present invention further comprises the conversion of said d(+)-amphetamine salt to the optically active free acid. It is to be understood that the optically active free acid referred to in this invention is the (+)-hydroxy acid. The volume ratio of said ethylene dichloride to said methylene chloride and of said tetramethylene dichloride to said chloroform is preferably about 2:1. Said crystallization is preferably conducted at a concentration of about 3–10% w/v.

DETAILED DESCRIPTION OF THE INVENTION

In one preferred embodiment of the present invention, the racemic acid is first dissolved in ethylene dichloride, e.g., with heating at reflux temperatures, and then is dried, filtered and concentrated. To this solution is added more ethylene dichloride and then d(+)-amphetamine. The mixture is heated to about 60°C., is seeded with resolved (+)-amphetamine salt and is then cooled for 3 hours to overnight. Additional purification may be carried out, if desired, by additional recrystallization from ethylene dichloride.

Alternatively, the racemic acid is dissolved in ethylene dichloride, but all the subsequent steps are carried out using dioxane, with the final recrystallizations also being performed using dioxane.

In another variation of the present invention, the racemic acid is first dissolved in methylene chloride, the d(+)-amphetamine is added in ethylene dichloride, and the final recrystallizations are from ethylene dichloride. Also, the d(+)-amphetamines may be added in a mixture of ethylene dichloride-methylene chloride (2:1) and the final recrystallization may be from this same combination.

In still another variation, the racemic acid may first be dissolved in methylene chloride, the d(+)-amphetamine may be introduced in tetramethylene dichloride, and the final recrystallizations may be carried out in a mixture of tetramethylene dichloride and chloroform (2:1).

In all of these instances, the crystallization is preferably conducted at a concentration of from about 3–10% w/v, no matter which solvent or combination of solvents is employed.

The crystallization step in the present invention may be carried out a temperature of from about −10° to 60°C., but will usually conveniently be performed at from about 25°–60°C. This crystallization will usually require a time period of from about 2–18 hours, and it is considered detrimental to allow the crystallization mixture to stand for longer periods because the product may become contaminated with the salt of the undesired isomer.

The starting material for this invention, 2-(2β-benzyloxymethyl-3α-hydroxy-4-cyclopentene-1α-yl)acetic acid is obtained by treating the corresponding ammonium salt with hydrochloric acid as is illustrated in the examples to follow. Details of the preparation of this ammonium salt have been published by Corey and his associates (*J. Amer. Chem. Soc.* 93, 1491, 1971).

It is further to be understood that the d(+)-amphetamine salt may be subsequently reconverted to the optically active free acid by solution in water, acidification with hydrochloric acid, and extraction into ether.

The following examples are given by way of illustration, and are in no way to be construed as limiting the scope of the appended claims.

EXAMPLE I

To a 500 ml. Erlenmeyer flask were added 22.6 g. (.081 moles) of 2-[2β-benzyloxymethyl-3α)-hydroxy-4-cyclopentene-1α-yl] acetic acid ammonium salt and 158.6 ml. of water. This mixture was stirred at room temperature and then 16.2 ml. (.0972 moles) 6N̄ HCl were added.

This mixture was extracted 4 times with 50 ml. portions of ethylene dichloride and then the ethylene dichloride layer was washed twice with water. The product was dried over magnesium sulfate, filtered and divided into two equal parts.

One portion of the above product equalling 134 ml., was placed under vacuum and concentrated to 11.7 g.

of an oil. The oil was dissolved in 106 ml. ethylene dichloride, heated to 60°C. in a steam bath, and then 5.48 g. (0.0405 mole) of d(+)-amphetamine were added dropwise. The warm solution was seeded with resolved d(+)-amphetamine salt and cooled overnight. The resulting dried solid weighed 7.85 g. (98% yield) melted at 106°–108°C., and afforded an $[\alpha]_d^{25} = +7.94$ (c = 1, MeOH).

Purification was carried out by two subsequent recrystallizations from ethylene dichloride (1 g. amphetamine salt in 10 ml. solvent). The resolved, pure d(+)-amphetamine salt (5.64 g., 71% yield) melted at 114–116°C. and afforded an $[\alpha]_d^{25} = 16.7$ (c = 1, MeOH).

EXAMPLE II

Using the procedures of Example I, 22.6 g. of the starting material were converted to the oil. The oil was then divided into two portions.

A 12.6 g. portion of the oil was dissolved in 40 ml. ethylene dichloride and then 5.48 g. d(+)-amphetamine was added to it. The mixture was seeded with the resolved d(+)-amphetamine salt and cooled overnight. The resulting dried solid weighed 8.55 g. (106% yield), melted at 108-110°C., and afforded an $[\alpha]_d^{25} = 6.40$ (c = 1, MeOH).

The above resolved d(+)-amphetamine salt (8 g.) was dissolved in 160 ml. of ethylene dichloride (1:20 ratio) at 60° and then was kept at room temperature overnight. A precipitate formed which was filtered and dried to give 6.68 g. (84% yield) d(+)-amphetamine salt, m.p. 105°–108°, $[\alpha]_d^{25} = +10.7$ (c = 1, MeOH). An additional recrystallization from ethylene dichloride (1:20 ratio) gave 3.49 g. (44% yield) pure resolved d(+)-amphetamine salt, $[\alpha]_d^{25} = +16.3$ (c = 1, MeOH), mp. 114°–116°. An 11.95 g. portion of the oil was dissolved in 70 ml. of dioxane and 5.48 g. d(+)-amphetamine were added. The mixture was seeded as above and cooled overnight. The resulting dried solid weighed 3.5 g. (44% yield), melted at 109°–112°C. and afforded an $[\alpha]_d^{25} = +8.38$ (c = 1, MeOH). Additional recrystallization from dioxane (1:10 ratio) yielded 1.02 g. (33%) pure d(+)-amphetamine salt, m.p. 109°–114°, $[\alpha]_d^{25} = +14.67$ (c = 1, MeOH).

Preparation of Resolved Free Acid: 2-[2R(β)-benzyloxymethyl-3,5-(α)-hydroxy-4-cyclopenten-1R-yl]acetic acid 2 g. resolved natural d(+)-amphetamine salt obtained above (5 m moles), $(\alpha)_D = +16.7$ was suspended in 15 ml. of distilled water at 0°C. It was then acidified to pH 4 by addition of 6N hydrochloric acid and extracted with 2X 25 ml. of methylene dichloride, and the organic layer was washed with water to remove (+)-amphetamine hydrochloride.

The methylene dichloride extract was separated, dried over anhydrous MgSO₄, filtered, and evaporated in vacuo to an oil to give resolved (+)-acid of 1.18 g. (90%), $(\alpha)_D^{25} = +5.6$ (c = 1, MeOH). Significant features of the infrared spectrum (film) were observed at 3.05 (acid OH), 3.3 (OH), and 5.8 (acid CO)µ.

EXAMPLE III

Using the procedure of Example I, the oil was prepared and 6.3 g. were dissolved in 159 ml. of ethylene dichloride at 60°and then kept at room temperature overnight (about 18 hours). The precipitate which formed was then filtered and dried to give 2.54 g. (64% yield) of d(+)-amphetamine salt, m.p. 102°–105°, $[\alpha]_d^{25} = +6.58$ (c = 1, MeOH). After two recrystallizations from ethylene dichloride, the pure resolved d(+)-amphetamine salt was obtained, $[\alpha]_d^{25} = +16.3$ (c = 1, MeOH), m.p. 114°–116°.

EXAMPLE IV

To a 500 ml. Erlenmeyer flask were added 22.6 g. of the starting material of Example I and 158.6 ml. water. The mixture was stirred at room temperature until the solution occurred and then 32.5 ml. of 10% HCl were added. The solution was then extracted four times with 50 ml. portions of methylene chloride and then the methylene chloride layer was washed twice with water, dried over magnesium sulfate and filtered.

A 116 portion of the above solution was concentrated in vacuo to 11.96 g. of an oil. The oil was dissolved in 42.4 ml. of ethylene dichloride and heated to 60°C. in a steam bath. Then 5.48 g. (0.0405 mole) d(+)-amphetamine in 63.6 ml. ethylene dichloride were added dropwise to the warm solution. The solution was seeded with the resolved d(+)-amphetamine salt and cooled overnight. The resulting dried solid weighed 9.05 g. (111.2% yield), melted at 99°–103°C., and afforded an $[\alpha]_d^{25} = 6.92$ (c = 1, MeOH).

Three additional recrystallizations from ethylene dichloride (1:10 ratio) were performed yielding 4.89 g. (61.5% yield) pure d(+)-amphetamine salt, m.p. 114°–116°C., $[\alpha]_d^{25} = +16.6$ (c = 1, MeOH).

EXAMPLE V

To a 500 ml. Erlenmeyer flask were added 11.3 g. of the starting material of Example I and 79.3 ml. of water. The mixture was stirred at room temperature until solution occurred and then 8.1 ml. of 6 N HCl was added. The solution was then extracted 4 times with 25 ml. portions of methylene chloride and then the methylene chloride layer was washed twice with water, dried over magnesium sulfate, filtered, and divided into 2 equal portions.

One portion of the above solution was concentrated in vacuo to 6.3 g. of an oil. The oil was dissolved in 35 ml. of tetramethylene dichloride and heated to 60°C. in a steam bath. Then 2.74 g. (0.021 moles) d(+)-amphetamine in 18 ml. tetramethylene dichloride were added dropwise to the warm solution. The solution was seeded as in the preceding examples and cooled overnight. The resulting dried solid weighed 6.9 g. (88% yield), melted at 98°–105°C., and afforded an $[\alpha]_d^{25} = 5.196$ (c = 1, MeOH).

The second portion of the above solution was concentrated in vacuo to 6.23 g. of the oil. Using the above procedures and the same amounts of the above reagents the resulting solid weighed 4.53 g. (114% yield), melted at 102°–104°C., and afforded an $[\alpha]_d^{25} = 7.03$ (c = 1, MeOH).

Recrystallization from a mixture of tetramethylenedichloridechloroform (2:1) (1 g. in 15 ml. of the solvent mixture) yielded 1.92 g. (26%), m.p. 104°–106°, $[\alpha]_d^{25} = +9.12$ (c = 1, MeOH).

An additional recrystallization from the same solvent combination yielded 1.59 g. (20% yield) pure d(+)-amphetamine salt, m.p. 112°–115°, $[\alpha]_d^{25} = 15.7$ (c = 1, MeOH).

EXAMPLE VI

The starting material of Example I (11.3 g.) was dissolved in 79.3 ml. of water at room temperature and 8.6 ml. of 6N HCl was added dropwise. The solution was then extracted four times with 25 ml. portions of ethylene dichloride (pH 2.5). Extract was washed twice with 56.5 ml. portion of water, and then was dried over magnesium sulfate, filtered, and evaporated to an oil (10.1 g.).

The oil was dissolved in 34 ml. of ethylene dichloride and 3.4 g. of d(+)-amphetamine in 16 ml. of ethylene dichloride was added at room temperature. After 3 hours, the solid thus formed was filtered. This solid, the resolved d(+)-amphetamine salt, weighed 2.25 g. (56% yield), melted at 105°–107°C. and exhibited as $[\alpha]_d^{25} = +9.37$ (c = 1, MeOH).

EXAMPLE VII

The starting material of Example I (11.3 g.) was dissolved in 79.3 ml. of water at room temperature with stirring. The mixture was acidified with 8.1 ml. of 6N HCl and the free acid thus generated was extracted four times with 25 ml. portions of methylene chloride. The product was then washed twice with 56.5 ml. portions of water and was dried over magnesium sulfate.

A 71 ml. portion of the above extract was evaporated to 6.18 g. of an oil. The oil was dissolved in 35 ml. ethylene dichloride at room temperature and then 2.47 g. of d(+)-amphetamine in 15 ml. of ethylene dichloride was added along with 25 ml. of methylene chloride. The mixture was stirred at room temperature for 10 minutes and then allowed to stand overnight (about 18 hours).

The solution was cooled to 10°C. and the crude resolved d(+)-amphetamine salt was filtered and dried. The product weighed 2.6 g. (65% yield), melted at 101°–105°C., and exhibited an $[\alpha]_d^{25} = +7.99$ (c = 1.02, MeOH).

Recrystallization of 1.2 g. of this crude salt was performed from ethylene dichloride-methylene chloride (2:1) to produce 1.15 g. of pure d(+)-amphetamine salt which melted at 110°–112°C. and exhibited an $[\alpha]_d^{25} = +11.34$ (c = 1.03 MeOH).

What is claimed is:

1. The process of resolving -(2β-benzyloxymethyl-3α-hydroxy-4-cyclopentene-1α-yl)acetic acid salt with d(+)-amphetamine which comprises fractionally crystallizing the d(+)-amphetamine salt of said acid from a solvent selected from the group consisting of ethylene dichloride; dioxane; ethylene dichloride-methylene chloride in a volume ratio of about 2:1 and tetramethylenedichloride-chloroform in a volume ratio of about 2:1 for a period of up to about 18 hours and then separating the resulting crystalline salt therefrom.

2. The process of claim 1 wherein said (+)-amphetamine salt is converted to the optically active free acid by dissolving the salt in water, acidifying with hydrochloric acid and extracting the acidified solution into ether.

3. The process of claim 1 wherein said crystallization is conducted at a concentration of about 3–10% weight by volume.

4. The process of claim 3 wherein said solvent is ethylene dichloride-methylene chloride.

5. The process of claim 3 wherein said solvent is tetramethylene dichloride-chloroform.

6. The process of claim 3 wherein said solvent is dioxane.

7. The process of claim 3 wherein said solvent is ethylene dichloride.

* * * * *